US011680647B2

(12) United States Patent
Khoury et al.

(10) Patent No.: US 11,680,647 B2
(45) Date of Patent: Jun. 20, 2023

(54) LOW-TORQUE VALVE

(71) Applicant: HAM-LET (ISRAEL—CANADA) LTD., Nazareth Illit (IL)

(72) Inventors: Solieman Khoury, Haifa (IL); Felix Shestatski, Karmiel (IL); Sergey Seryogin, Migdal Ha-Emek (IL); Roni Chekler, Nazareth-Illit (IL)

(73) Assignee: HAM-LET (ISRAEL-CANADA) LTD., Nazareth Illit (IL)

( * ) Notice: Subject to any disclaimer, the term of this patent is extended or adjusted under 35 U.S.C. 154(b) by 0 days.

(21) Appl. No.: 17/328,412

(22) Filed: May 24, 2021

(65) Prior Publication Data
US 2021/0278001 A1   Sep. 9, 2021

Related U.S. Application Data

(63) Continuation-in-part of application No. 16/454,372, filed on Jun. 27, 2019, now abandoned, which is a
(Continued)

(51) Int. Cl.
*F16K 5/04* (2006.01)

(52) U.S. Cl.
CPC ............ *F16K 5/045* (2013.01); *F16K 5/0442* (2013.01); *F16K 5/0471* (2013.01)

(58) Field of Classification Search
CPC ...... F16K 5/0407; F16K 5/0442; F16K 5/045; F16K 5/0457; F16K 5/0471;
(Continued)

(56) References Cited

U.S. PATENT DOCUMENTS 3,041,036 A * 6/1962 McFarland, Jr. ..... F16K 5/0471
251/315.11
3,314,644 A ‡ 4/1967 Dwyer ................. F16K 27/065
251/309
(Continued)

FOREIGN PATENT DOCUMENTS

CA        2476813      ‡  2/2006
CA        2476813 A1      2/2006
(Continued)

OTHER PUBLICATIONS

Written Opinion of the International Searching Authority PCT/IL2017/051399 dated Mar. 29, 2018 6 pages.‡
(Continued)

*Primary Examiner* — Hailey K. Do
(74) *Attorney, Agent, or Firm* — The Roy Gross Law Firm, LLC; Roy Gross

(57) ABSTRACT

A valve for controlling a fluid flow comprises: (a) a valve body having an internal cavity; (b) a valve stem receivable within the internal cavity; the valve stem having a control portion configured and a tail portion; the control portion having a first diameter thereof; (c) a deformable valve seat carried by the control portion in a coaxial conformal manner; and (d) a ring mountable within the internal cavity.
The control portion has a circumferentially arranged area adjacent to the tail portion. The circumferentially arranged area is of a second diameter smaller than the first diameter. The ring is mountable between a nut and the valve seat such that the nut when secured to the valve body presses onto the valve seat such that the valve seat is deformed within a space between the circumferentially arranged area defined by the second diameter and fills the space in a sealed manner.

5 Claims, 8 Drawing Sheets

Related U.S. Application Data continuation-in-part of application No. PCT/IL2017/051399, filed on Dec. 28, 2017.

(60) Provisional application No. 62/440,470, filed on Dec. 30, 2016.

(58) Field of Classification Search
CPC .... F16K 5/0464; F16K 5/0478; F16K 5/0485; F16K 5/0492; F16K 5/18; F16K 5/181; F16K 5/182; F16K 25/005; F16K 27/065; F16K 39/06; F16K 41/026; F16K 41/046
See application file for complete search history.

(56) References Cited

U.S. PATENT DOCUMENTS

| | | | | |
|---|---|---|---|---|
| 3,337,182 A * | 8/1967 | Roy, Sr. | ................ | F16K 5/184 251/316 |
| 3,353,785 A * | 11/1967 | Eggers | ................ | F16K 5/184 251/182 |
| 3,572,383 A * | 3/1971 | Natalizia | ................ | F16K 5/0407 251/192 |
| 3,612,478 A * | 10/1971 | Blazek | ................ | F16K 5/0471 251/189 |
| 4,705,058 A * | 11/1987 | Marklew | ................ | B29C 45/14754 251/309 |
| 5,327,929 A ‡ | 7/1994 | Radossi | ................ | F16K 5/0478 137/315.26 |
| 5,595,206 A ‡ | 1/1997 | Soria Vega | ................ | F16K 27/067 137/15.22 |
| 5,947,443 A ‡ | 9/1999 | Shellenbarger | ................ | F16K 5/0478 251/181 |
| 2016/0208936 A1 ‡ | 7/2016 | Gomi | ................ | H01M 8/04201 |
| 2021/0278001 A1 | 9/2021 | Khoury et al. | | |

FOREIGN PATENT DOCUMENTS

| | | | | |
|---|---|---|---|---|
| CN | 104806779 A | | 4/2015 | |
| CN | 104806779 | ‡ | 7/2015 | |
| GB | 664494 A | * | 1/1952 | ........... F16K 5/0407 |
| WO | 2005100830 A1 | | 10/2005 | |
| WO | WO-2005100830 A1 | ‡ | 10/2005 | ........... F16K 5/0471 |

OTHER PUBLICATIONS

International Search Report PCT/IL2017/051399 Completed Mar. 29, 2018; dated Mar. 29, 2018 4 pages.‡
PCT International Search Report for International Application No. PCT/IL2017/051399, completed Mar. 29, 2018, 4pp.
PCT Written Opinion for International Application No. PCT/IL2017/051399, completed Mar. 29, 2018, 6pp.
PCT International Preliminary Report on Patentability for International Application No. PCT/IL2017/051399, dated Jul. 2, 2019, 7pp.

\* cited by examiner
‡ imported from a related application

LOW-TORQUE VALVE

CROSS REFERENCE TO RELATED APPLICATIONS

This is a Continuation-in-Part (CIP) patent application which claims priority and the benefit to U.S. patent application Ser. No. 16/454,372 filed Jun. 27, 2019, which is a continuation-in-part (OP) of PCT Patent Application PCT/IL2017/051399 filed Dec. 28, 2017 and claims benefit to U.S. Provisional Patent application Ser. No. 62/440,470 filed Dec. 30, 2016. The content of these applications is incorporated by reference herein in their entirety.

FIELD OF THE INVENTION

The present invention relates to valves, and more particularly to low-torque valves.

BACKGROUND OF THE INVENTION

A plurality of devices for controlling of fluid flow are known, such as valves and in particular ball-type valves, which are adapted to selectively open and close a fluid flow passage. It is particularly known that large-diameter ball-type valves are typically operated using high-torque forces.

U.S. Pat. No. 5,947,443 discloses a gas distribution valve including a body defining an inlet and an outlet passage, a central well containing a cylindrical plug disposed for arcuate displacement therein and including a transverse thru-bore that can be rotated into and out of axial alignment with the flow passages of the body for opening and closing the valve respectively. Overmolded elastomeric seat seals are provided for superior sealing that are urged against the well walls by an arcuate leaf spring intervening between the seals and the plug and extending in a direction concentric with the plug.

US2016208936 discloses a high-pressure trunnion ball valve having an upper stem and a lower stem having the same diameter are provided on an upper side and a lower side of the ball in an extending manner secured by slider bearings coated by a PTFC resin. There is a long-felt and unmet need for providing valves demonstrating reliable and no-leaks behavior by means of an integral valve seat embracing a flow regulation portion.

SUMMARY OF THE INVENTION

It is hence one object of the invention to disclose a valve for controlling a fluid flow. The aforesaid valve comprises: (a) a valve body having an internal cavity; (b) a valve stem receivable within the internal cavity; the valve stem having a control portion configured for blocking the fluid flow and a tail portion configured to transfer a rotational torque; the control portion having a first diameter thereof; (c) a deformable valve seat carried by the control portion in a coaxial conformal manner; (d) a ring mountable within the internal cavity; and (e) a nut configured for securing the ring within the internal cavity.

It is a core purpose of the invention to provide the control portion having a circumferentially arranged area adjacent to the tail portion. The circumferentially arranged area is of a second diameter smaller than the first diameter. The ring is mountable between the nut and the deformable valve seat such that the nut when secured to the valve body presses onto the deformable valve seat such that the deformable valve seat is deformed within a space between the circumferentially arranged area defined by the second diameter and fills the space in a sealed manner.

Another object of the invention is to disclose an outer surface of the control portion and an internal surface of the valve seat which are cylindrical.

A further object of the invention is to disclose valve seat formed by machining.

Another object of the invention is to disclose the valve seat made of a polymeric material selected from the group consisting of PEEK, PCTFE, PTFE, reinforced PTFE, modified PTFE, PFA and any combination thereof.

Another object of the invention is to disclose the valve comprising a disc adapted to be seated between the valve stem and the valve body and thereby preventing a direct mechanical contact.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

In accordance with an embodiment of the present invention, a valve is provided for controlling and adjusting passage of fluid within a flow system. Fluid is defined hereby as liquid, gas, vapor, gel or any other material or state thereof that can flow via one or more directing elements such as tubes, pipes, conduits and the like.

The flow system can be any system requiring control and adjustment of flow of fluids such as an engine gas transport system, a water piping system, flow—control components for the semiconductor industry, gas and oil (energy) industry, or any other system or industry that requires valve control for fluid flow control.

In accordance with some embodiments of the present invention, the valve is configured and located such as to control fluid flow between one or more outlets of at least one fluid directing means such as a tube, conduit, pipeline and the like into one or more inlets of at least one other directing means to one or more inlets of directing means. The valve can control a throughput of the fluid flow or prevent passage thereof by being located between a conduit outlet and another conduit inlet.

It is appreciated that usually all components of ball-type valves are made of stainless steel, other than the valve seat, which is made of a polymeric, relatively resilient material.

Figure 1A:
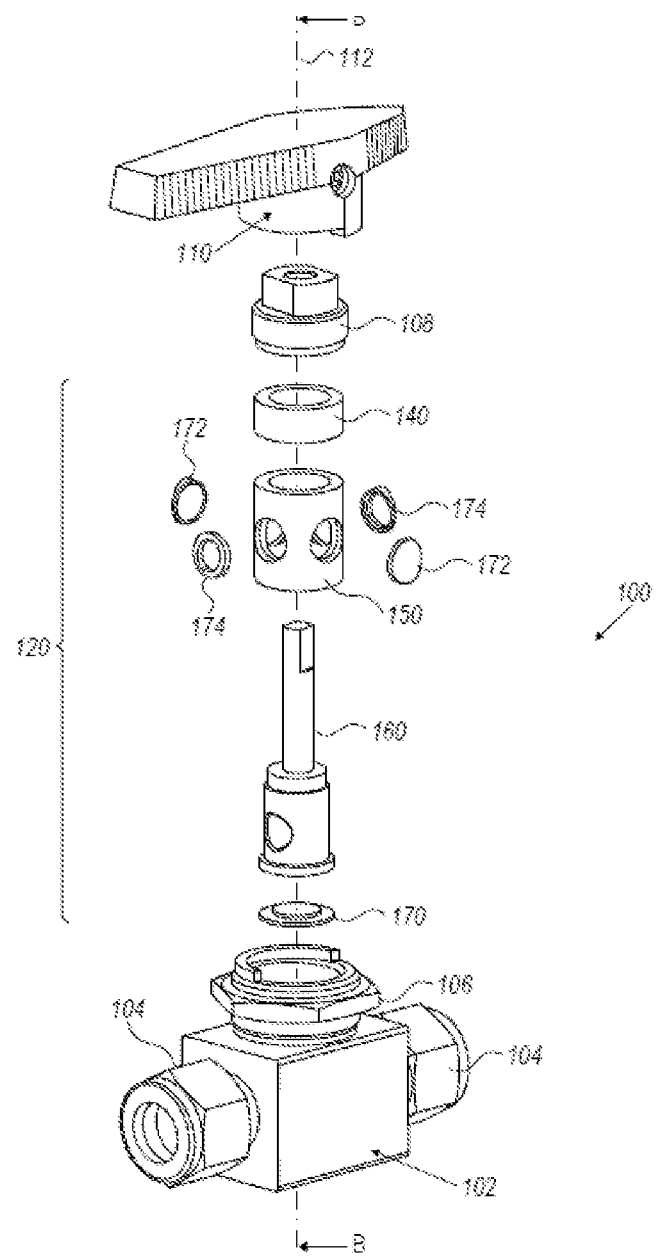
FIGS. 1A and 1B are respective simplified pictorial exploded illustration and sectional exploded illustration of a low-torque valve constructed and operative in accordance with an embodiment of the present invention, section being taken along lines B-B in FIG. 1A.
Figure 1B:
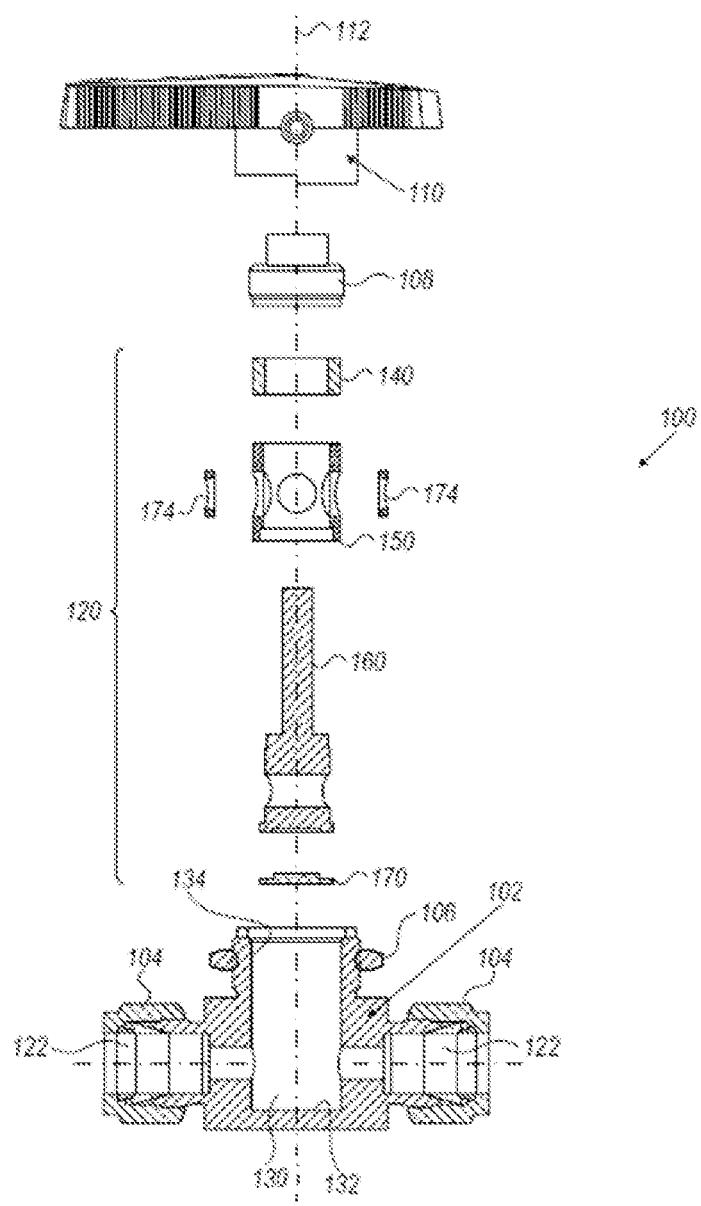

Reference is now made to FIGS. 1A and 1B, which are respective simplified pictorial exploded illustration and sectional exploded illustration of a low-torque valve constructed and operative in accordance with an embodiment of the present invention, section being taken along lines B-B in FIG. 1A.

A low-torque valve 100 is seen in FIGS. 1A and 1B, including a valve body 102 having a plurality of valve ports 104, generally extending in different radial directions and a connector portion 106 adapted for attachment with a nut 108. A handle 110 adapted to be selectably rotatably attached to the nut 108 and connector portion 106 of valve body 102.

It is noted that valve body 102 can have any number of valve ports 104.

A valve assembly 120 is arranged along a longitudinal axis 112 and is configured to be disposed between valve body 102 and handle 110.

It is seen in FIG. 1B that fluid flow passage is defined by bores 122 formed through ports 104 of the valve body 102. Bores 122 fluidly communicate with a valve assembly receiving cavity 130. Valve assembly receiving cavity 130 defines an upwardly facing surface 132 and a circumferential surface 134.

It is a particular feature of an embodiment of the present invention that as seen in FIGS. 1A and 1B, valve assembly 120 preferably includes a ring 140, adapted to be mounted onto a valve seat 150, which is adapted to be seated around a portion of a valve stem 160, which in turn is adapted to be seated onto a disc 170. It is additionally seen that typically two seat discs 172 and two seat rings 174 are adapted to be mounted onto valve seat 150 to prevent it from buckling when the valve seat 150 is assembled into the low-torque valve 100.

Figure 2A:
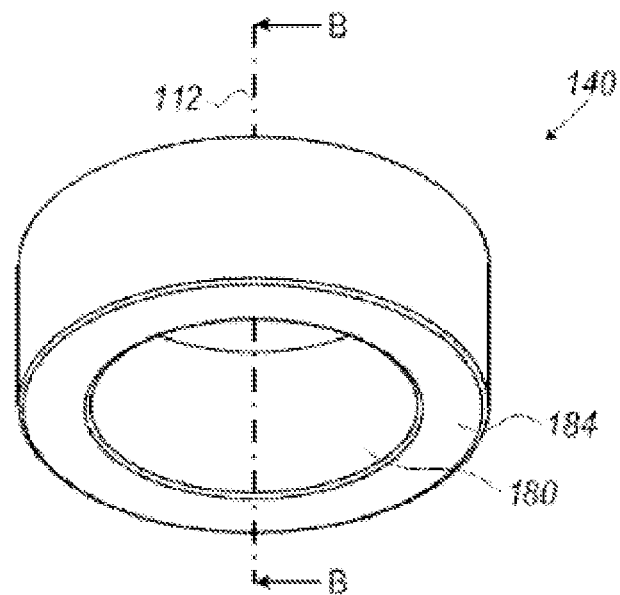
FIGS. 2A and 2B are respective simplified pictorial and sectional illustrations of a ring forming part of the low-torque valve of FIGS. 1A and 1B, section being taken along lines B-B in FIG. 2A.
Figure 2B:
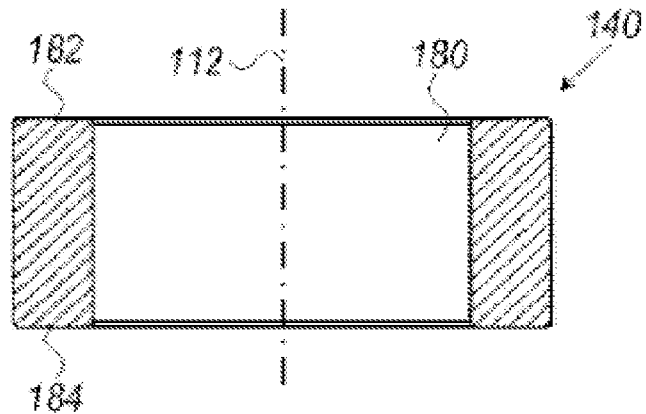

Reference is now made to FIGS. 2A and 2B, which are respective simplified pictorial and sectional illustrations of ring 140 forming part of the low-torque valve 100 of FIGS. 1A and 1B, section being taken along lines B-B in FIG. 2A.

Ring 140 is preferably an integrally formed element made of stainless steel and arranged along longitudinal axis 112. The ring 140 forms part of the valve assembly 120.

Ring 140 defines a through-going bore 180, an upwardly facing annular surface 182 and a downwardly facing annular surface 184.

Figure 3A:
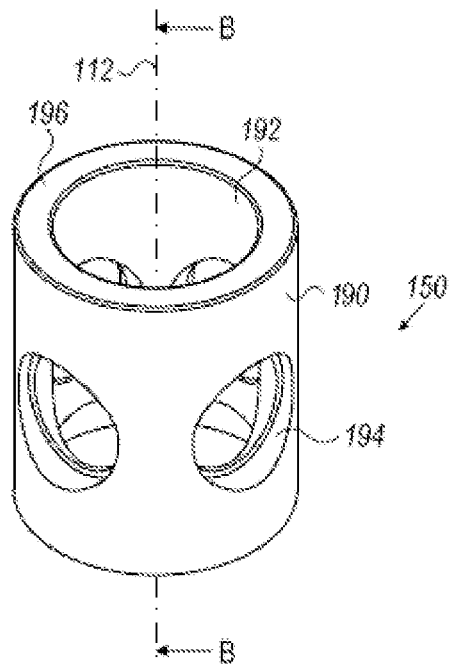
FIGS. 3A and 3B are respective simplified pictorial and sectional illustrations of a valve seat forming part of the low-torque valve of FIGS. 1A and 1B, section being taken along lines B-B in FIG. 3A.
Figure 3B:
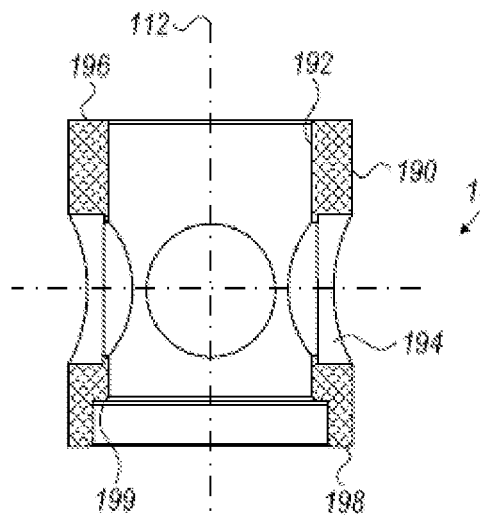

Reference is now made to FIGS. 3A and 3B, which are respective simplified pictorial and sectional illustrations of valve seat 150 forming part of the low-torque valve 100 of FIGS. 1A and 1B, section being taken along lines B-B in FIG. 3A.

Valve seat 150 is preferably an integrally formed element made of a polymeric material and arranged along longitudinal axis 112. The valve seat 150 forms part of the valve assembly 120.

It is a particular feature of an embodiment of the present invention that valve seat 150 is a hollow cylindrical element defining an outwardly facing cylindrical surface 190 and an inwardly facing cylindrical surface 192, adapted to fit to the cylindrical outer surface of valve stem 160.

It is noted that the inner surface of valve seat 150 can be of any non-spherical shape.

A plurality of bores 194 are formed in valve seat 150 and extend along axes which are perpendicular to longitudinal axis 112. It is appreciated that at least two of bores 194 are adapted to selectably communicate with bores 122 of valve body 102, when the low-torque valve 100 is disposed in an open operative orientation.

Valve seat 150 defines an upwardly facing surface 196 and a downwardly facing surface 198 and a circumferential downwardly facing shoulder 199 formed adjacent the downwardly facing surface 198.

It is a particular feature of an embodiment of the present invention that the cylindrical valve seat 150 is formed by machining, thus allowing manufacturing of the valve seat 150 using the following materials: PEEK (polyetheretherketone); PCTFE (polychlorotrifluoroethylene); PTFE (polytetrafluoroethylene); RPTFE (Reinforced PTFE) in addition to TFM (modified PTFE) and PFA (Perfluoroalkoxy alkane), which are typically used while manufacturing valve seats by means of injection molding. It is noted that the valve seat 150 can additionally be manufactured using any other suitable polymeric material that provides the desired sealing characteristics between the valve stem 160 and the valve body 102.

Figure 4A:
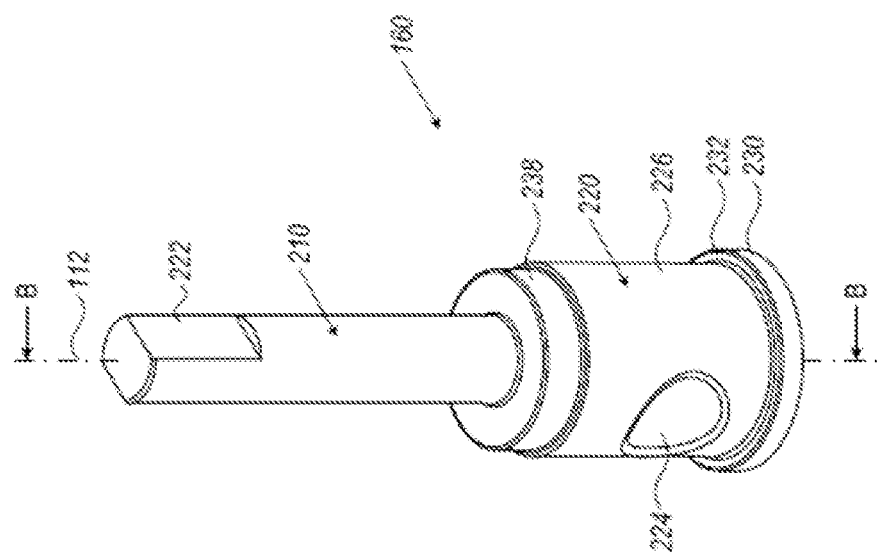
FIGS. 4A and 4B are respective simplified pictorial and sectional illustrations of a valve stem forming part of the low-torque valve of FIGS. 1A and 1B, section being taken along lines B-B in FIG. 4A.
Figure 4B:
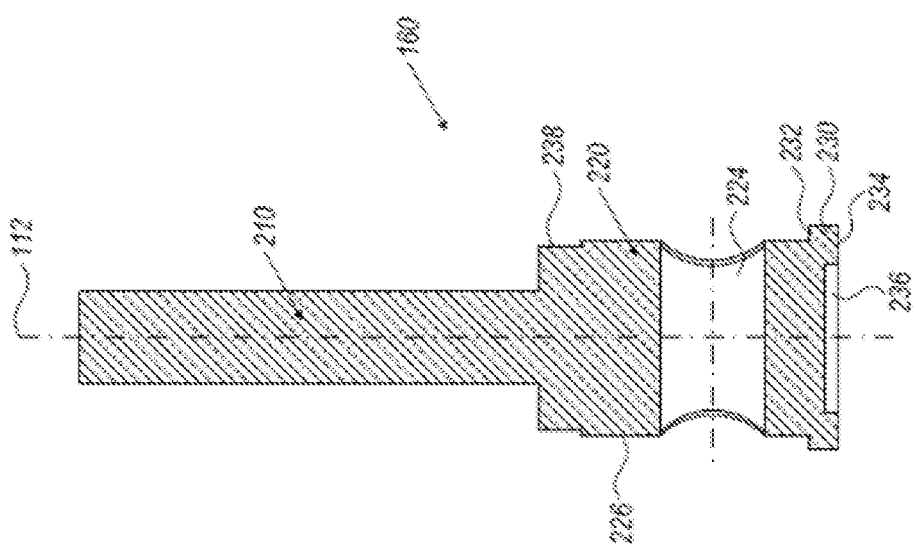

Reference is now made to FIGS. 4A and 4B, which are respective simplified pictorial and sectional illustrations of valve stem 160 forming part of the low-torque valve 100 of FIGS. 1A and 1B, section being taken along lines B-B in FIG. 4A.

Valve stem 160 is preferably an integrally formed element made of stainless steel and arranged along longitudinal axis 112. The valve stem 160 forms part of the valve assembly 120.

Valve stem 160 preferably includes an elongate connection portion 210 and a flow regulation portion 220.

Connection portion 210 has a non-rotational engagement surface 222, adapted for non-rotatably fixating the valve stem 160 relative to valve handle 110.

It is a particular feature of an embodiment of the present invention that flow regulation portion 220 of valve stem 160 has a cylindrical cross-section having a throughgoing bore 224 extending along an axis which is generally perpendicular to longitudinal axis 112. It is appreciated that bore 224 is adapted to selectably communicate with bores 122 of valve body 102, when the valve handle 110 is rotatably suitably positioned, such as to position the low-torque valve 100 in an open operative orientation.

The flow regulation portion 220 of valve stem 160 defines an outwardly facing cylindrical surface 226. It is noted that alternatively, the flow regulation portion 220 of valve stem 160 can be of any other non-spherical shape.

A slightly outwardly extending circumferential flange 230 is formed at the bottom end of flow regulation portion 220 of valve stem 160. The flange 230 defines an upwardly facing shoulder surface 232 and a downwardly facing surface 234. A recess 236 is formed in downwardly facing surface 234.

It is noted that a circumferential shoulder recess 238 is formed at the top end of the flow regulation portion 220, which is operative for engaging the inner surface of ring 140, and thereby enhancing sealing between the valve stem 160 and the ring 140.

It is further noted that valve stem 160 may be integrally formed or alternatively, it may be formed of several separate parts coupled to each other.

Figure 5A:
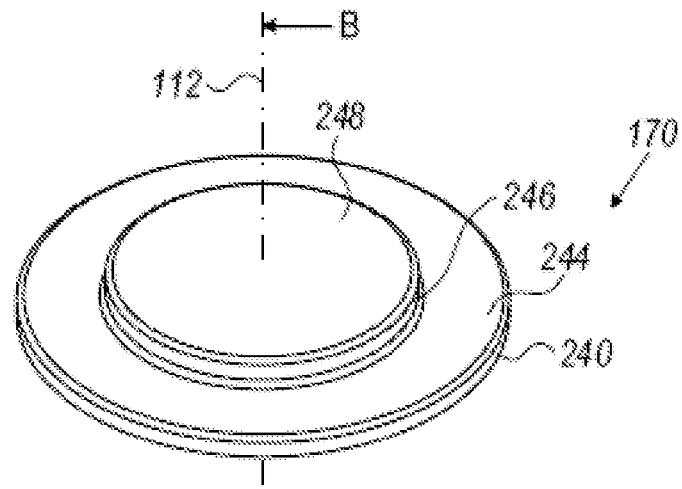
FIGS. 5A and 5B are respective simplified pictorial and sectional illustrations of a disc forming part of the low-torque valve of FIGS. 1A and 1B, section being taken along lines B-B in FIG. 5A.
Figure 5B:
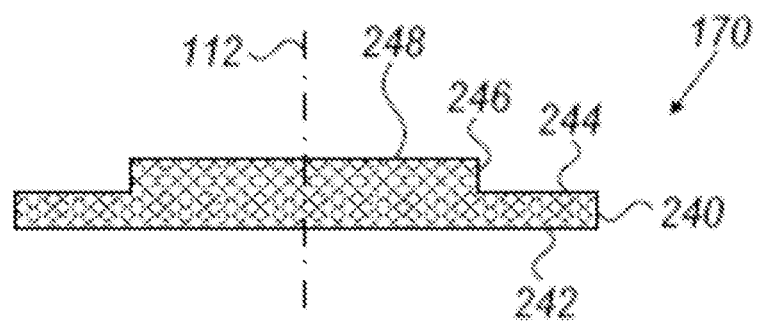

Reference is now made to FIGS. 5A and 5B, which are respective simplified pictorial and sectional illustrations of disc 170 forming part of the low-torque valve 100 of FIGS. 1A and 1B, section being taken along lines B-B in FIG. 5A.

Disc 170 is preferably an integrally formed element made of PCTFE and arranged along longitudinal axis 112. The disc 170 forms part of the valve assembly 120.

Disc 170 includes a circular portion 240 defining a downwardly facing surface 242 and an upwardly facing surface 244 and an upwardly extending circular protrusion 246 defining an upwardly facing surface 248. The protrusion 246 is adapted to be received within recess 236 of valve stem 160.

Figure 6:
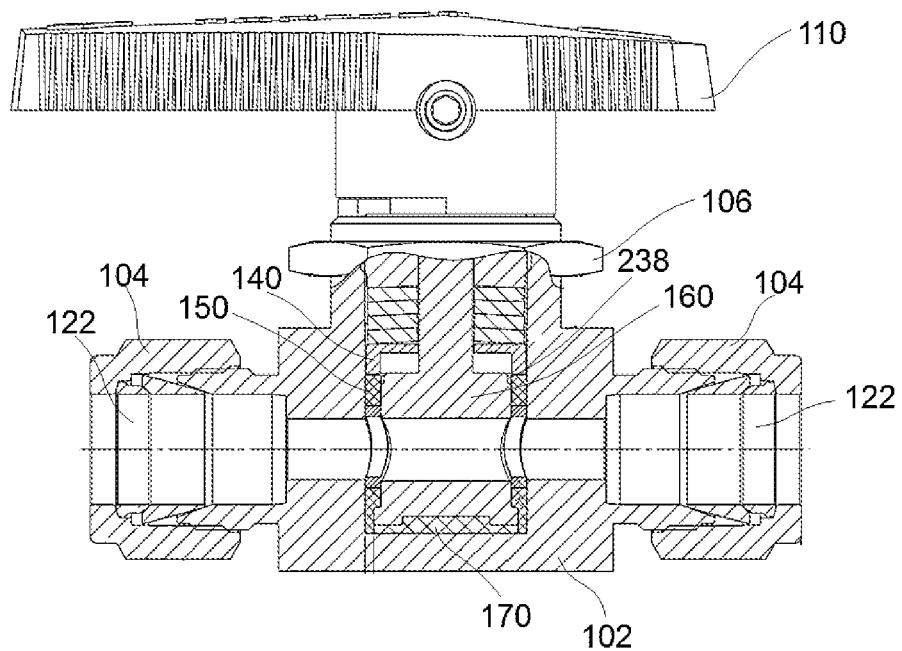
FIG. 6 is a simplified cut-out illustration of the assembled low-torque valve of FIGS. 1A and 1B.

Reference is now made to FIG. 6, which is a simplified cut-out illustration of the assembled low-torque valve 100 of FIGS. 1A and 1B. It is seen in FIG. 6 that valve assembly 120 is partially disposed within the valve assembly receiving cavity 130 of valve body 102 and connection portion 210 of valve stem 160 partially extends upwardly and engages the valve handle 110 for rotation therewith.

It is further seen in FIG. 6 that valve assembly 120 is assembled such that the valve seat 150 is press-fit assembled between the valve stem 160 and the valve body 102. Valve stem 160 is retained between valve seat 150 and disc 170 by engagement of shoulder surface 232 of flange 230 with downwardly facing shoulder 199 of valve seat 150 and engagement of downwardly facing surface 234 of flange 230 with upwardly facing surface 244 of disc 170. Protrusion 246 of disc 170 is inserted into recess 236 of valve stem 160. It is seen that downwardly facing surface 242 of disc 170 engages upwardly facing surface 132 of valve body 102 and downwardly facing surface 198 of valve seat 150 engages upwardly facing surface 132 of valve body 102.

It is appreciated that disc 170, which is made of a relatively resilient material, is operative to prevent contact between two metal parts, namely between the valve stem 160 and the valve body 102.

It is further noted that disc seats 172 and ring seats 174, which are typically made of stainless steel, are each mounted into one of bores 194 of valve seat 150, in order to prevent the valve seat 150, which is made of relatively soft polymeric material, from buckling.

It is a particular feature of an embodiment of the present invention that when valve assembly 120 is inserted into valve body 102, and valve handle 110 is rotated relative to valve body 102, ring 140 exerts force on valve seat 150, such that valve seat 150 is deformed and pressurized between valve stem 160 and valve body 102 in order to create a seal therebetween.

It is appreciated that when the handle 110 and the valve stem 160 are rotatably suitably positioned with respect to valve body 102, bore 224 of valve stem 160, bores 194 of valve seat 150 and bores 122 of valve body 102 are aligned, thereby positioning the low-torque valve in an open operative orientation, thereby permitting fluid flow passage between ports 104 of valve body 102. Alternatively, when handle 110 and valve stem 160 are differently rotated with respect to valve body 102, bore 224 of valve stem 160, bores 194 of valve seat 150 and bores 122 of valve body 102 are not aligned, thereby positioning the low-torque valve in a closed operative orientation, thereby preventing fluid flow passage between ports 104 of valve body 102.

Figure 7:
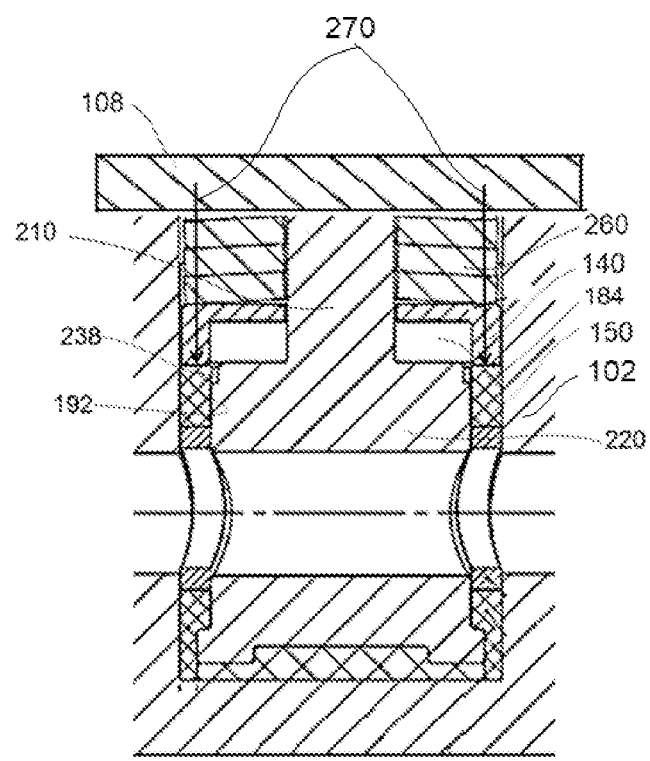
FIG. 7 is an enlarged cut-out illustration of the assembled low-torque valve of FIGS. 1A and 1B.

It is seen in FIGS. 6 and 7 that an interference-fit engagement is formed between the valve seat 150, valve body 102 and valve stem 160. It is particularly seen that outwardly facing cylindrical surface 226 of valve stem 160 engages inwardly facing cylindrical surface 192 of valve seat 150 and outwardly facing cylindrical surface 190 of valve seat 150 engages circumferential surface 134 of valve body 102.

It is a particular feature of an embodiment of the present invention that minimal contact surface exists between valve seat 150 and valve stem 160 on which axial forces along longitudinal axis 112 are exerted, thus providing for low torque forces between valve stem 160 and valve seat 150 and thus in turn between handle 110 and valve body 102. It is particularly seen that upon rotation of handle 110, valve seat 150 is pressurized between ring 140 and valve stem 160 due to the following engagements: engagement between annular surface 184 of ring 140 and upwardly facing surface 196 of valve seat 150 and engagement of upwardly facing shoulder surface 232 of valve stem 160 and downwardly facing shoulder 199 of valve seat 150.

It is a particular feature of an embodiment of the present invention that due to the fact that both the flow control portion 220 of valve stem 160 and valve seat 150 are cylindrically arranged. When nut 108 is secured to valve body 102, presses onto valve seat 150 via valve packing arrangement 260 and ring 140. Numeral 270 refers to arrow indicating the direction of applied pressure. Force 270 is parallel to longitudinal axis 112

Valve seat 150 is deformed under pressure applied by nut 108 via valve packing arrangement 260 and ring 140 is deformed and fills circumferentially recess 238 and improves tightness of valve.

It is a further particular feature of an embodiment of the present invention that due to the fact that the valve seat 150 is machined and both valve seat 150 and valve stem 160 have cylindrical cross-section, these two components can be easily separated at any given time.

It is a yet further particular feature of an embodiment of the present invention that the operating torque of the low-torque valve 100, required for selectably positioning the valve 100 in the open operative orientation or the closed operative orientation, is at least 40% lower than the operating torque of typical commercially available ball valves having the same valve seat outer diameter and valve seat material as the low-torque valve 100 constructed in accordance with an embodiment of the present invention.

It is additionally noted that valve assembly 120 is replaceable following a pre-determined amount of operation cycles of low-torque valve 100.

It will be appreciated by persons skilled in the art that the present invention is not limited by what has been particularly shown and described hereinabove. Rather the scope of the present invention includes both combinations and sub-combinations of various features described hereinabove as well as variations and modifications thereof which are not in the prior art.

The invention claimed is:

1. A valve for controlling a fluid flow, comprising:
    a. a valve body having an internal cavity;
    b. a valve stem receivable within said internal cavity; said valve stem having a control portion configured for blocking said fluid flow and a tail portion configured to transfer a rotational torque; said control portion having a first diameter thereof; said control and tail portions having control-portion and tail-portion diameters;
    c. a deformable valve seat carried by said control portion in a coaxial conformal manner;
    d. a ring mountable within said internal cavity; and
    e. a nut configured for securing said ring within said internal cavity;

wherein said valve stem comprises a middle portion located between said control and tail portions, said middle portion being generally cylindrically shaped; said middle portion has a middle-portion diameter smaller than said control-portion diameter but greater than said tail-portion diameter;

wherein said ring is mountable between said nut and said deformable valve seat such that said nut when secured to said valve body presses onto said deformable valve seat such that said deformable valve seat is deformed to fill a space in a sealed manner, said space defined between said middle portion and said valve body.

2. The valve according to claim 1, wherein an outer surface of said control portion and an internal surface of said valve seat are cylindrical.

3. The valve according to claim 1, wherein said valve seat is formed by machining.

4. The valve according to claim 1, wherein said valve seat is made of a polymeric material selected from the group consisting of PEEK, PCTFE, PTFE, reinforced PTFE, modified PTFE, PFA and any combination thereof.

5. The valve according to claim 1 comprising a disc adapted to be seated between said valve stem and said valve body and thereby preventing a direct mechanical contact.

\* \* \* \* \*